US012720021B2

(12) United States Patent
Yasuda

(10) Patent No.: US 12,720,021 B2
(45) Date of Patent: Aug. 25, 2026

(54) PROJECTOR INCLUDING PARALLELIZING LENS AND POLARIZERS

(71) Applicant: SEIKO EPSON CORPORATION, Tokyo (JP)

(72) Inventor: Masanori Yasuda, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 354 days.

(21) Appl. No.: 18/505,427

(22) Filed: Nov. 9, 2023

(65) Prior Publication Data

US 2024/0155086 A1 May 9, 2024

(30) Foreign Application Priority Data

Nov. 9, 2022 (JP) ................................ 2022-179370

(51) Int. Cl.
*H04N 9/31* (2006.01)
*G02B 3/08* (2006.01)

(52) U.S. Cl.
CPC ............ *H04N 9/3108* (2013.01); *G02B 3/08* (2013.01); *H04N 9/3167* (2013.01)

(58) Field of Classification Search
CPC .. G03B 21/005; G03B 21/006; G03B 21/008; G03B 21/28; G03B 21/145; G03B 21/208; G03B 21/2053; G03B 21/2073; G02B 3/00; G02B 3/08; H04N 9/315; H04N 9/3108; H04N 9/3126; H04N 9/3141; H04N 9/3152; H04N 9/3167
See application file for complete search history.

(56) References Cited

U.S. PATENT DOCUMENTS 5,662,402 A 9/1997 Kim
9,004,693 B2 * 4/2015 Huang ................ G02B 27/286 353/20
2012/0236218 A1 * 9/2012 Haruyama ......... G03B 21/2073 349/5
2013/0242210 A1 * 9/2013 Endo ..................... G03B 21/14 349/8
2016/0342020 A1 * 11/2016 Tang ................ G02F 1/133528
(Continued)

FOREIGN PATENT DOCUMENTS

JP H09-101495 A 4/1997

*Primary Examiner* — Sultan Chowdhury
(74) *Attorney, Agent, or Firm* — Dority & Manning, P.A.

(57) ABSTRACT

A projector of the present disclosure includes a light source outputting a white light containing a first polarization component and a second polarization component, a parallelizing lens having a lens face parallelizing the white light outputted from the light source and a planar face opposite to the lens face, a first polarizer having a light incident surface and a light exiting surface and transmitting a light of the first polarization component of the white light and blocking a light of the second polarization component, a single light modulation device modulating the light based on an image signal and generating an image light, and a projection lens projecting the image light, wherein the light of the first polarization component transmitted through the first polarizer enters the single light modulation device, and the planar face of the parallelizing lens and one of the light incident surface of the first polarizer and the light exiting surface of the first polarizer are in optical contact.

16 Claims, 3 Drawing Sheets

(56) References Cited

U.S. PATENT DOCUMENTS

| | | | | |
|---|---|---|---|---|
| 2019/0155135 | A1* | 5/2019 | Imae | H04N 9/3167 |
| 2020/0073222 | A1* | 3/2020 | Arihara | H04N 13/307 |
| 2020/0401032 | A1* | 12/2020 | Akiyama | G03B 21/2013 |
| 2022/0208041 | A1* | 6/2022 | Ikeda | G02B 30/25 |

* cited by examiner

PROJECTOR INCLUDING PARALLELIZING LENS AND POLARIZERS

The present application is based on, and claims priority from JP Application Serial Number 2022-179370, filed Nov. 9, 2022, the disclosure of which is hereby incorporated by reference herein in its entirety.

BACKGROUND

1. Technical Field

The present disclosure relates to a projector.

2. Related Art

JP-A-9-101495 discloses a single-LCD projector including a light source outputting a light, a collector lens collecting the light entered from the light source, a polarizer passing a predetermined linearly-polarized light component in the light entered from the light source, an image display panel entered by the light passing through the polarizer, and a projection lens projecting an image light output from the image display panel on a projected surface.

In the projector, the collector lens and the polarizer are separated and an air layer intervenes between the collector lens and the polarizer. Accordingly, there is a problem that lights are respectively reflected at an interface between the collector lens and the air and an interface between the polarizer and the air and a loss is caused in the light entered into the image display panel.

SUMMARY

In order to solve the above described problem, according to an aspect of the present disclosure, a projector including a light source outputting a white light containing a first polarization component and a second polarization component, a parallelizing lens having a lens face parallelizing the white light output from the light source and a planar face opposite to the lens face, a first polarizer having a light incident surface and a light exiting surface and transmitting a light of the first polarization component of the white light and blocking a light of the second polarization component, a single light modulation device entered by the light of the first polarization component transmitted through the first polarizer, and modulating the light based on an image signal and generating an image light, and a projection lens projecting the image light, wherein the planar face of the parallelizing lens and one surface of the light incident surface and the light exiting surface of the first polarizer are in optical contact is provided.

BRIEF DESCRIPTION OF THE DRAWINGS

FIG. 2 shows a configuration of a main part of a light incident-side polarizing member.

FIG. 3 shows a configuration of a main part of a projector of a second embodiment.

DESCRIPTION OF EMBODIMENTS

Figure 1:
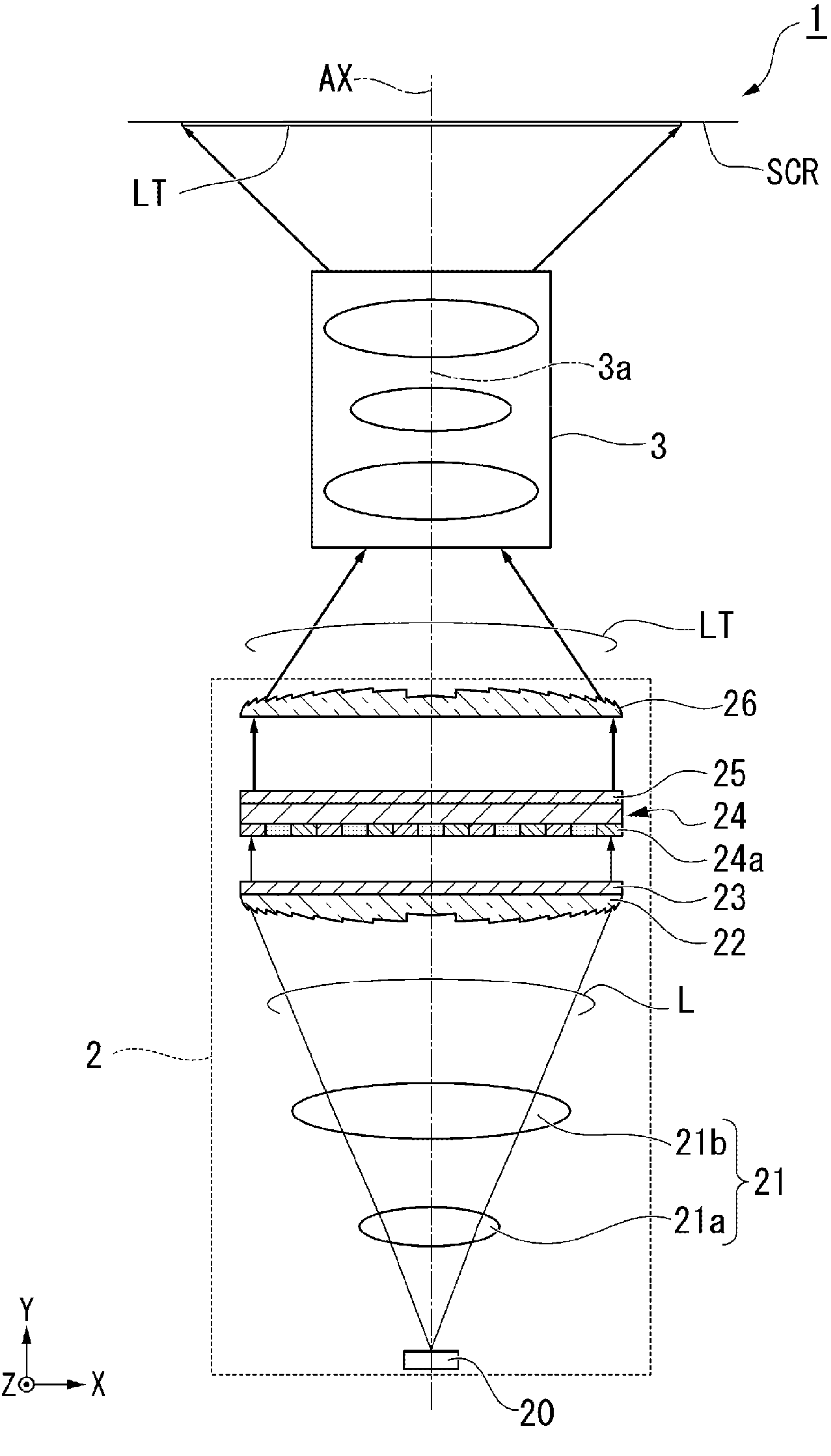
FIG. 1 shows a schematic configuration of a projector of a first embodiment.

As below, one embodiment of the present disclosure will be explained in detail with reference to the drawings. Note that, in the drawings used in the following explanation, characteristic parts may be enlarged for convenience for clearly showing the characteristics and dimension ratios etc. of the respective component elements are not necessarily the same as real dimension ratios etc.

First Embodiment

FIG. 1 shows a schematic configuration of a projector 1 of the embodiment.

As shown in FIG. 1, the projector 1 of the embodiment is a projection-type image display apparatus that displays a color image on a screen SCR as a projected surface.

The projector 1 includes an image generation unit 2 and a projection lens 3.

As below, placement relationships among the respective members may be explained using an XYZ coordinate system shown in the drawings. In the respective drawings, a Y-axis is an axis along an optical axis AX as a reference axis on which optical components are arranged in the projector 1. An X-axis is an axis orthogonal to the Y-axis and along a lateral width direction of an image light LT projected on the screen SCR. A Z-axis is an axis orthogonal to the X-axis and the Y-axis and along upward and downward directions of the projector 1.

In the embodiment, for example, both directions along the Z-axis are collectively referred to as "upward and downward directions Z" in the projector 1, and a side in the +Z direction is referred to as "upside" and a side in the −Z direction is referred to as "downside". Further, both directions along the X-axis are collectively referred to as "leftward and rightward directions X" in the projector 1, and a side in the +X direction is referred to as "right side" and a side in the −X direction is referred to as "left side". Furthermore, both directions along the Y-axis are collectively referred to as "frontward and rearward directions Y" in the projector 1, and a side in the +Y direction is referred to as "front side" and a side in the −Y direction is referred to as "rear side".

Note that the upward and downward directions Z, the leftward and rightward directions X, and the frontward and rearward directions Y are simply the names for explanation of the placement relationships among the respective component members of the projector 1, but do not designate the real placement attitudes and directions in the projector 1.

The image generation unit 2 includes a light source 20, a first collecting system 21, a parallelizing lens 22, a light incident-side polarizing member 23, one liquid crystal panel 24, a light exiting-side polarizing member 25, and a second collecting system 26. The light source 20 of the embodiment includes e.g., a light emitting diode (LED). The light source 20 including the light emitting diode outputs an unpolarized white light L in which a plurality of linearly-polarized components are superimposed and a polarization state is not observed as a whole.

The unpolarized white light L is a light containing e.g., a first polarization component as a linearly-polarized component transmitted through the light incident-side polarizing member 23 and a second polarization component as a linearly-polarized component blocked by the light incident-side polarizing member 23.

The first collecting system 21 collects the white light L radially output from the light source 20. The first collecting system 21 includes e.g., two convex lenses 21*a*, 21*b*. Note that the number of lenses forming the first collecting system 21 is not particularly limited, but may be one, three, or more. Not limited to the above described configuration, but a configuration using reflection mirrors placed in pairs in the X directions and the Z directions to surround the light output from the light source 20 so that light output openings formed by the respective mirrors may have rectangular shapes may be employed.

The white light L collected by the first collecting system 21 enters the parallelizing lens 22.

The parallelizing lens 22 parallelizes the white light L entering from the first collecting system 21. The parallelizing lens 22 has a lens face 22*a* parallelizing the white light L output from the light source 20 and a planar face 22*b* opposite to the lens face 22*a*.

The parallelizing lens 22 of the embodiment includes a resin Fresnel lens made and functions as a convex lens having positive power. The lens face 22*a* of the parallelizing lens 22 including the Fresnel lens has a concavo-convex surface substantially in a saw-toothed section shape. As a constituent material of the first collecting system 21, e.g., a resin having a refractive index of about 1.5 is used.

In the projector 1 of the embodiment, the dimension in the frontward and rearward directions Y along the optical axis AX of the projector 1 is suppressed using the parallelizing lens 22 including the Fresnel lens.

The light incident-side polarizing member 23 is provided at the light incident side of the liquid crystal panel 24. The light incident-side polarizing member 23 is provided integrally with the parallelizing lens 22 as will be described later.

Figures 2, 3:
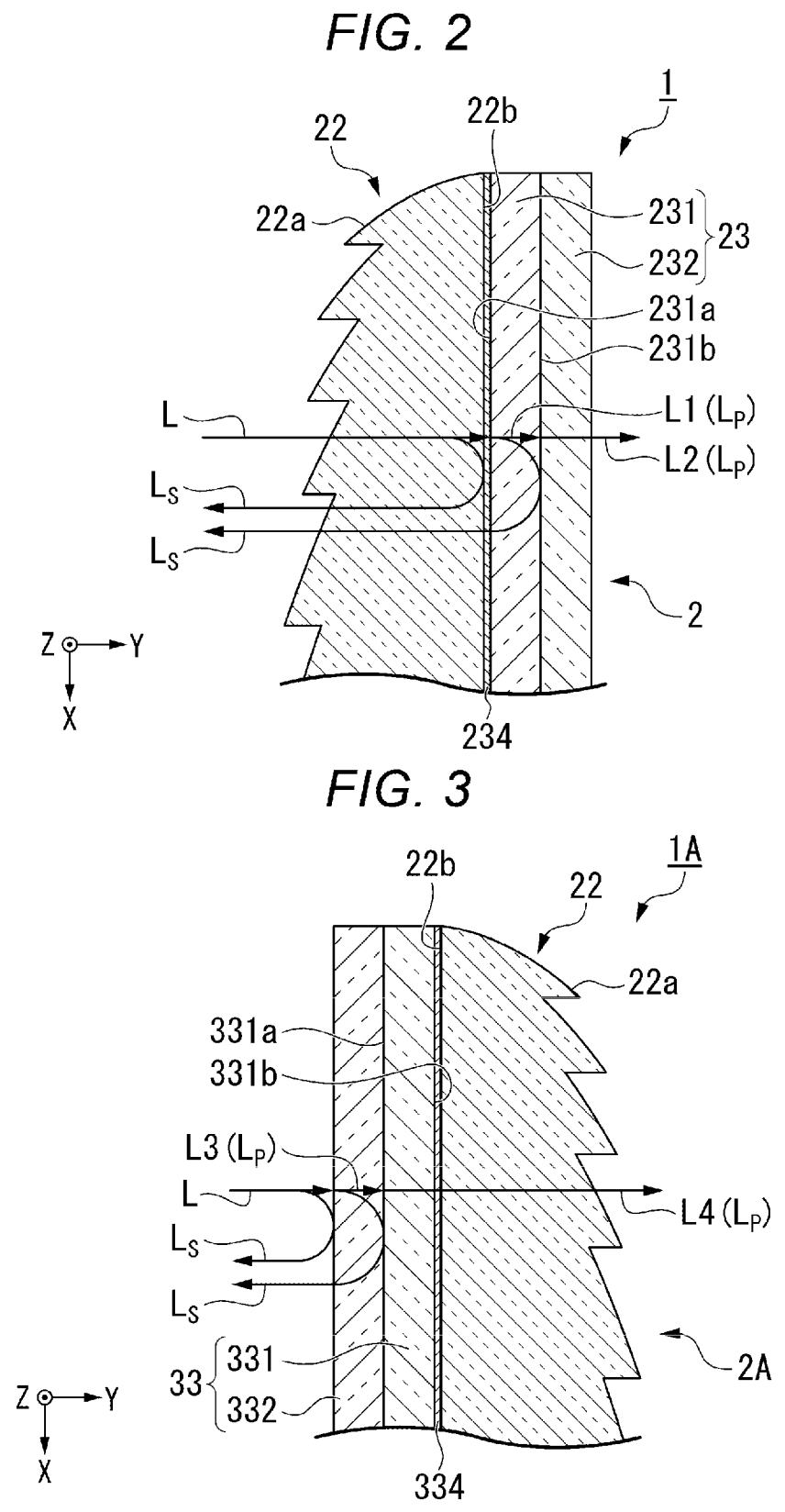

FIG. 2 shows a configuration of a main part of the light incident-side polarizing member 23.

As shown in FIG. 2, the light incident-side polarizing member 23 of the embodiment includes a first polarizer 231 and a second polarizer 232.

The first polarizer 231 is placed at the light exiting side of the parallelizing lens 22. In the embodiment, the parallelizing lens 22 is placed with the lens face 22*a* directed toward the light incident side. That is, the first polarizer 231 is placed at the planar face 22*b* side opposite to the lens face 22*a* of the parallelizing lens 22. The first polarizer 231 has a light incident surface 231*a* and a light exiting surface 231*b*.

The planar face 22*b* of the parallelizing lens 22 and the light incident surface 231*a* of the first polarizer 231 are in optical contact.

Here, the optical contact between the planar face 22*b* and the light incident surface 231*a* refers to contact in a condition in which the planar face 22*b* and the light incident surface 231*a* are optically stable, specifically, a condition in which an air layer does not intervene and a loss by reflection caused at an interface with the air layer is reduced. For example, the planar face 22*b* and the light incident surface 231*a* may be in direct contact not via an air layer. Or, the planar face 22*b* and the light incident surface 231*a* may be in indirect contact via an optical adhesive material.

In the embodiment, the planar face 22*b* of the parallelizing lens 22 and the light incident surface 231*a* of the first polarizer 231 are bonded via an optical adhesive material 234. That is, the light incident-side polarizing member 23 of the embodiment is bonded to the parallelizing lens 22 via the optical adhesive material 234. Thereby, the light incident-side polarizing member 23 is held on the parallelizing lens 22 in good condition.

As the optical adhesive material 234, for example, a transparent material having a refractive index close to those of the parallelizing lens 22 and the first polarizer 231 is used, and thereby, a loss of light by an interface between the planar face 22*b* of the parallelizing lens 22 and the optical adhesive material 234 may be reduced.

In the projector 1 of the embodiment, the planar face 22*b* of the parallelizing lens 22 and the light incident surface 231*a* of the first polarizer 231 are in optical contact, and an air layer does not intervene between the parallelizing lens 22 and the light incident-side polarizing member 23. Accordingly, the white light L output from the planar face 22*b* of the parallelizing lens 22 does not enter the air layer, but directly enters the light incident-side polarizing member 23, i.e., the light incident surface 231*a* of the first polarizer 231. Therefore, the reflection of light by the interface between the light incident surface 231*a* of the first polarizer 231 and the air layer is suppressed and the white light L may efficiently enter the light incident surface 231*a* of the first polarizer 231.

In the embodiment, the first polarizer 231 is an organic polarizer of an organic material and a reflection-type polarizer reflecting a predetermined polarized light.

The first polarizer 231 transmits a light of a first polarization component Lp of the white light L and reflects and blocks a light of a second polarization component Ls. Note that the first polarization component Lp and the second polarization component Ls refer to polarization directions with respect to an incident surface of the liquid crystal panel 24.

In the embodiment, blocking the light of the second polarization component Ls by the first polarizer 231 refers to reflecting the light of the second polarization component Ls not to output the light from the light exiting surface 231*b*.

Generally, a polarizer can mostly reflect a light of a predetermined polarization component, but is hard to reflect the light at 100%. Accordingly, in this specification, blocking the light of the second polarization component Ls by the first polarizer 231 also refers to reflecting not all of the light of the second polarization component Ls contained in the white light L, but transmitting part of the second polarization component Ls.

Further, the white light L of unpolarized light contains other linearly-polarized lights than the first polarization component Lp and the second polarization component Ls. Accordingly, a white light L1 transmitted through the first polarizer 231 contains not only the first polarization component Lp but also other linearly-polarized lights than the second polarization component Ls.

As described above, it is difficult to selectively separate only the first polarization component Lp of the white light L using only the first polarizer 231.

On the other hand, in the light incident-side polarizing member 23 of the embodiment, the second polarizer 232 is further placed at the light exiting side of the first polarizer 231. Accordingly, the light of the second polarization component Ls transmitted through the first polarizer 231 may be blocked by the second polarizer 232 and lowering of contrast may be suppressed. The second polarizer 232 is an organic polarizer of an organic material and an absorption-type polarizer absorbing other polarization components than that in a predetermined polarization direction. The first polarizer 231 and the second polarizer 232 are stacked. That is, the second polarizer 232 physically contacts the first polarizer 231. Thereby, an air layer does not intervene between the first polarizer 231 and the second polarizer 232 and a loss by reflection of light at an interface between the first polarizer 231 and the second polarizer 232 may be reduced.

The second polarizer 232 transmits the light of the first polarization component Lp as a first polarization component of the white light L1 transmitted through the first polarizer

231 and absorbs and blocks the light of the second polarization component Ls as a second polarization component.

The light incident-side polarizing member 23 of the embodiment may transmit the first polarization component Lp of the white light L and blocks the second polarization component Ls as the other polarization component than the first polarization component Lp by stacking the first polarizer 231 including the reflection-type polarizer and the second polarizer 232 including the absorption-type polarizer. Therefore, the light incident-side polarizing member 23 may enter a white light L2 containing the first polarization component Lp as a main component into the liquid crystal panel 24.

Further, in the light incident-side polarizing member 23 of the embodiment, the polarizers are placed in the order of the first polarizer 231 as the reflection-type polarizer and the second polarizer 232 as the absorption-type polarizer from the incident side of the white light L. Accordingly, unnecessary polarization components not to be entered into the liquid crystal panel 24 of the components contained in the white light L are reflected at the light incident side, and thereby, the amount of absorbed light by the absorption-type polarizer placed downstream is reduced. Therefore, the light incident-side polarizing member 23 of the embodiment may suppress heat generation of the whole polarizing member compared to a configuration in which the polarizers are placed in the order of the absorption-type polarizer and the reflection-type polarizer at the incident side of the white light L.

The white light L2 output from the light incident-side polarizing member 23 enters the liquid crystal panel 24. The liquid crystal panel 24 includes a color filter 24*a*. The liquid crystal panel 24 with the color filter 24*a* generates a color image light LT by modulating a white light L3 output from the light incident-side polarizing member 23 according to image information.

The projector 1 of the embodiment employs a single-LCD system using the single liquid crystal panel 24 as a light modulation device, and thereby, the apparatus configuration is simplified and downsized. The liquid crystal panel 24 of the embodiment corresponds to "light modulation device".

The light exiting-side polarizing member 25 is provided at the light exiting side of the liquid crystal panel 24. In the embodiment, the light exiting-side polarizing member 25 is attached to the liquid crystal panel 24. The light incident-side polarizing member 23 and the light exiting-side polarizing member 25 are placed so that polarization axes may be orthogonal to each other.

In the projector 1 of the embodiment, the white light L3 in the polarization direction of the first polarization component is modulated by the liquid crystal panel 24, and thereby, the image light LT with desired brightness is output from the light exiting-side polarizing member 25 and a contrast ratio of an image is increased.

The second collecting system 26 is placed at the light exiting side of the liquid crystal panel 24. Specifically, the second collecting system 26 is placed at the light exiting side of the light exiting-side polarizing member 25. The second collecting system 26 collects the light modulated by the liquid crystal panel 24. In the embodiment, the second collecting system 26 includes a Fresnel lens and functions as a convex lens having positive power. Accordingly, in the second collecting system 26, a thickness in an optical axis direction is suppressed, and thereby, the dimension in the frontward and rearward directions Y along the optical axis AX of the projector 1 is suppressed.

In the projector 1 of the embodiment, the image light LT modulated by the liquid crystal panel 24 is collected by the second collecting system 26, and the lens diameter of the projection lens 3 placed downstream of the image generation unit 2 may be reduced.

The projection lens 3 includes a plurality of lens groups and enlarges and projects the image light LT output from the image generation unit 2 toward the screen SCR. Thereby, an enlarged color image is displayed on the screen SCR.

Note that a lens shift mechanism shifting the position of the projection lens 3 in a predetermined direction within a plane along the XZ-plane orthogonal to an optical axis 3*a* of the projection lens 3 may be provided. The lens shift mechanism is provided, and thereby, the optical axis 3*a* of the projection lens 3 is moved, for example, in the upward and downward directions Z, the leftward and rightward directions X, and oblique directions crossing the upward and downward directions Z and the leftward and rightward directions X and the image position displayed on the screen SCR may be adjusted.

As described above, the projector 1 of the embodiment includes the light source 20 outputting the white light L containing the first polarization component Lp and the second polarization component Ls, the parallelizing lens 22 having the lens face 22*a* parallelizing the white light L output from the light source 20 and the planar face 22*b* opposite to the lens face 22*a*, the first polarizer 231 having the light incident surface 231*a* and the light exiting surface 231*b* and transmitting the light of the first polarization component Lp of the white light L and blocking the light of the second polarization component Ls, one liquid crystal panel 24 entered by the light of the first polarization component Lp transmitted through the first polarizer 231 and the second polarizer 232 and generating the image light LT by modulating the light based on the image signal, and the projection lens 3 projecting the image light LT. The planar face 22*b* of the parallelizing lens 22 and the light incident surface 231*a* of the first polarizer 231 are in optical contact.

According to the projector 1 of the embodiment, the light incident surface 231*a* of the first polarizer 231 in the light incident-side polarizing member 23 optically contacts the planar face 22*b* of the parallelizing lens 22, and an air layer does not intervene between the parallelizing lens 22 and the light incident-side polarizing member 23. Accordingly, the white light L output from the parallelizing lens 22 enters the light incident surface 231*a* of the first polarizer 231 not via the air layer. Therefore, the reflection of light by the interface of the air layer intervening between the parallelizing lens 22 and the first polarizer 231 is suppressed, and the light incident-side polarizing member 23 may efficiently take in the white light L.

As described above, the projector 1 of the embodiment may display a bright image with reduced power consumption by efficiently taking the white light L from the light source 20 in the liquid crystal panel 24 and increasing light use efficiency.

Second Embodiment

Subsequently, a configuration of a projector of a second embodiment will be explained.

The basic configuration of the projector of the second embodiment is the same as that of the first embodiment, but different from the first embodiment in the layout of the image generation unit. Accordingly, as below, the explanation of the whole projector is omitted and the layout of the image generation unit will be mainly explained. Note that the members and configurations in common with the first embodiment have the same signs.

FIG. 3 shows a configuration of a main part of the projector of the embodiment. FIG. 3 is an enlarged view of the main part showing a configuration around a light incident-side polarizing member.

As shown in FIG. 3, in an image generation unit 2A of a projector LA of the embodiment, a light incident-side polarizing member 33 is placed at the light incident side of the parallelizing lens 22.

The light incident-side polarizing member 33 of the embodiment includes a first polarizer 331 and a second polarizer 332. The first polarizer 331 is placed at the light incident side of the parallelizing lens 22. In the embodiment, the parallelizing lens 22 is placed with the planar face 22*b* directed toward the light incident side. That is, the first polarizer 331 is placed at the planar face 22*b* side opposite to the lens face 22*a* of the parallelizing lens 22. The first polarizer 331 has a light incident surface 331*a* and a light exiting surface 331*b*.

The planar face 22*b* of the parallelizing lens 22 and the light exiting surface 331*b* of the first polarizer 331 are in optical contact. In the embodiment, the planar face 22*b* and the light exiting surface 331*b* are bonded via an optical adhesive material 334. As the optical adhesive material 334, for example, a transparent material having a refractive index close to those of the parallelizing lens 22 and the first polarizer 331 is used, and thereby, a loss by reflection of light by an interface between the planar face 22*b* of the parallelizing lens 22 and the optical adhesive material 334 may be reduced.

In the embodiment, the first polarizer 331 is an organic polarizer of an organic material and an absorption-type polarizer absorbing a predetermined polarized light. The second polarizer 332 is an organic polarizer of an organic material and a reflection-type polarizer reflecting a predetermined polarized light. The second polarizer 332 and the first polarizer 331 are stacked. That is, the second polarizer 332 physically contacts the first polarizer 331. Thereby, an air layer does not intervene between the first polarizer 331 and the second polarizer 332, and a loss by reflection of light at an interface between the first polarizer 331 and the second polarizer 332 may be reduced.

The second polarizer 332 transmits a light of the first polarization component Lp as a first polarization component of the white light L and reflects and blocks a light of the second polarization component Ls as a second polarization component. The first polarizer 331 transmits a light of the first polarization component Lp as a first polarization component of the white light L3 transmitted through the second polarizer 332 and absorbs and blocks a light of the second polarization component Ls as a second polarization component. The first polarizer 331 of the embodiment absorbs the second polarization component Ls contained in the white light L3.

As described above, the light incident-side polarizing member 33 of the embodiment may transmit the first polarization component Lp of the white light L and blocks the second polarization component Ls as the other polarization component than the first polarization component Lp by stacking the second polarizer 332 including the reflection-type polarizer and the first polarizer 331 including the absorption-type polarizer. Therefore, the light incident-side polarizing member 33 may enter a white light L4 containing the first polarization component Lp as a main component into the liquid crystal panel 24.

In the light incident-side polarizing member 33 of the embodiment, the polarizers are placed in the order of the reflection-type polarizer and the absorption-type polarizer from the incident side of the white light L, and thereby, heat generation of the whole polarizing member may be suppressed like the light incident-side polarizing member 23 of the first embodiment.

Also, in the projector LA of the embodiment, the light incident-side polarizing member 33 is placed at the at the light incident side of the parallelizing lens 22, and thereby, the white light L4 containing the first polarization component Lp transmitted through the light incident-side polarizing member 33 as a main component enters the parallelizing lens 22. Accordingly, the white light L4 containing the first polarization component formed by removal of unnecessary polarization components in advance enters the parallelizing lens 22, and the amount of light transmitted through the parallelizing lens 22 may be reduced to about half. Therefore, in the projector 1A of the embodiment, degradation of the parallelizing lens 22 including the resin Fresnel lens by the light may be suppressed.

Further, in the projector LA of the embodiment, the light exiting surface 331*b* of the first polarizer 331 and the planar face 22*b* of the parallelizing lens 22 are in optical contact, and an air layer does not intervene between the parallelizing lens 22 and the light incident-side polarizing member 33. Accordingly, the white light L4 output from the light incident-side polarizing member 33 enters the planar face 22*b* of the parallelizing lens 22 not via the air layer. Therefore, the reflection of light by the interface of the air layer intervening between the light incident-side polarizing member 33 and the parallelizing lens 22 is suppressed, and the parallelizing lens 22 may efficiently take in the white light L4.

As described above, the projector LA of the embodiment may display a bright image with reduced power consumption by efficiently taking the white light L from the light source 20 in the liquid crystal panel 24 and increasing light use efficiency.

Further, in the projector 1A of the embodiment, the white light L4 in the polarization direction of the first polarization component is modulated by the liquid crystal panel 24, and thereby, the image light LT with desired brightness is output and an image with a high contrast ratio may be displayed.

Third Embodiment

Subsequently, a configuration of a projector of a third embodiment will be explained.

The basic configuration of the projector of the third embodiment is the same as that of the first embodiment, but different from the first embodiment in the layout of the image generation unit. Accordingly, as below, the explanation of the whole projector is omitted and the layout of the image generation unit will be mainly explained. Note that the members and configurations in common with the first embodiment have the same signs.

Figure 4:
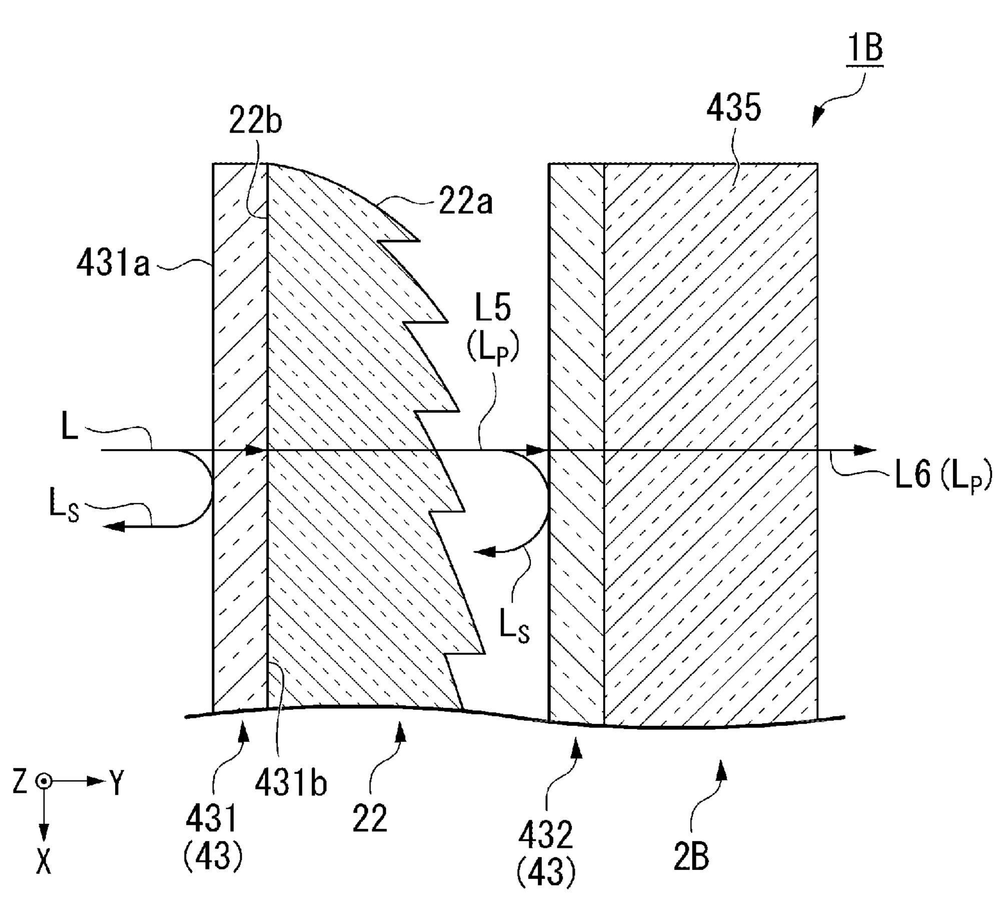
FIG. 4 shows a configuration of a main part of a projector of a third embodiment.

FIG. 4 shows a configuration of a main part of a projector of a third embodiment. FIG. 4 is an enlarged view of the main part showing a configuration around a light incident-side polarizing member.

As shown in FIG. 4, in an image generation unit 2B of a projector 1B of the embodiment, a light incident-side polarizing member 43 includes a first polarizer 431 and a second polarizer 432. In the embodiment, the first polarizer 431 and the second polarizer 432 are separately formed. That is, the first polarizer 431 and the second polarizer 432 are placed apart from each other in a direction along the optical axis AX.

The first polarizer 431 is placed at the light incident side of the parallelizing lens 22. The first polarizer 431 has a light incident surface 431*a* and a light exiting surface 431*b*.

In the embodiment, the parallelizing lens 22 is placed with the planar face 22*b* directed toward the light incident side. The first polarizer 431 is placed at the planar face 22*b* side opposite to the lens face 22*a* of the parallelizing lens 22.

The planar face 22*b* of the parallelizing lens 22 and the light exiting surface 431*b* of the first polarizer 431 are in optical contact. In the embodiment, the first polarizer 431 is formed on the planar face 22*b* of the parallelizing lens 22. The parallelizing lens 22 also has a function as a supporting base member for the first polarizer 431.

The light exiting surface 431*b* of the first polarizer 431 physically contacts the planar face 22*b* of the parallelizing lens 22. Thereby, an air layer does not intervene between the first polarizer 431 and the parallelizing lens 22 and a loss by reflection of light at an interface between the first polarizer 431 and the parallelizing lens 22 may be reduced.

In the embodiment, the first polarizer 431 is an organic polarizer of an organic material and a reflection-type polarizer reflecting a predetermined polarized light. The second polarizer 432 is an organic polarizer of an organic material and an absorption-type polarizer absorbing a predetermined polarized light. The second polarizer 432 is placed at the light exiting side of the parallelizing lens 22. The second polarizer 432 is supported by a light-transmissive substrate 435.

The first polarizer 431 transmits a light of the first polarization component Lp as a first polarization component of the white light L and reflects and blocks a light of the second polarization component Ls as a second polarization component. A white light L5 transmitted through the first polarizer 431 is parallelized by the parallelizing lens 22 and enters the second polarizer 432. The second polarizer 432 transmits a light of the first polarization component Lp as a first polarization component of the white light L5 transmitted through the first polarizer 431 via the parallelizing lens 22 and absorbs and blocks a light of the second polarization component Ls as a second polarization component. The second polarizer 432 of the embodiment absorbs other linearly-polarized lights than the first polarization component Lp contained in the white light L5.

As described above, the light incident-side polarizing member 43 may enter a white light L6 containing the first polarization component Lp as a main component into the liquid crystal panel 24.

Also, in the projector 1B of the embodiment, the light exiting surface 431*b* of the first polarizer 431 and the planar face 22*b* of the parallelizing lens 22 are in optical contact, and an air layer does not intervene between the parallelizing lens 22 and the first polarizer 431. Accordingly, the light transmitted through the first polarizer 431 enters the planar face 22*b* of the parallelizing lens 22 not via the air layer. Therefore, the reflection of light by an interface of the air layer intervening between the first polarizer 431 and the parallelizing lens 22 is suppressed, and the parallelizing lens 22 may efficiently take in the light transmitted through the first polarizer 431.

As described above, the projector 1B of the embodiment may display a bright image with reduced power consumption by efficiently taking the white light L from the light source 20 in the parallelizing lens 22 and increasing light use efficiency.

Further, in the projector 1B of the embodiment, the white light L6 in the polarization direction of the first polarization component is modulated by the liquid crystal panel 24, and thereby, the image light LT with desired brightness is output and an image with a high contrast ratio may be displayed.

The resin Fresnel lens forming the parallelizing lens 22 of the embodiment may cause a polarization disturbance due to heat generation with light irradiation. On the other hand, in the projector 1B of the embodiment, the second polarizer 432 separately provided from the first polarizer 431 is placed downstream of the parallelizing lens 22. According to the configuration, even when the polarization state of the white light L transmitted through the first polarizer 431 is disturbed through the parallelizing lens 22, the first polarization component Lp of the light output from the parallelizing lens 22 may be transmitted and the light of other polarization components than the first polarization component may be absorbed by the second polarizer 432.

Therefore, even when the polarization disturbance by the parallelizing lens 22 is caused, the light incident-side polarizing member 43 of the embodiment may efficiently enter the light of the first polarization component Lp of the white light L into the liquid crystal panel 24 by the second polarizer 432 placed downstream of the parallelizing lens 22.

Note that the technical scope of the present disclosure is not limited to the above described embodiments, but various changes can be made without departing from the scope of the present disclosure.

For example, in the light incident-side polarizing member 23 of the first embodiment, the planar face 22*b* of the parallelizing lens 22 and the light incident surface 231*a* of the first polarizer 231 are bonded by the optical adhesive material 234, however, the planar face 22*b* of the parallelizing lens 22 and the light incident surface 231*a* of the first polarizer 231 may be in physical contact. According to the configuration, the light output from the planar face 22*b* of the parallelizing lens 22 directly enters the light incident surface 231*a* of the first polarizer 231, and thereby, the first polarizer 231 may take in the light more efficiently.

The configuration in which the planar face 22*b* of the parallelizing lens 22 and the light incident surface 231*a* of the first polarizer 231 are in physical contact may be realized, for example, by pushing and holding of the light incident-side polarizing member 23 against the parallelizing lens 22 via an urging member such as a leaf spring.

Similarly, in the projector 1A of the second embodiment, the planar face 22*b* of the parallelizing lens 22 and the light exiting surface 331*b* of the first polarizer 331 may be in physical contact.

In addition, the specific description of the shapes, the numbers, the placements, the materials, etc. of the respective component elements of the projector is not limited to those in the above described embodiments, but changes can be appropriately made.

The present disclosure can be applied to a projector using a digital micromirror device as a light modulation device.

As below, the summary of the present disclosure will be appended.

Appendix 1

A projector includes a light source outputting a white light containing a first polarization component and a second polarization component, a parallelizing lens having a lens face parallelizing the white light output from the light source and a planar face opposite to the lens face, a first polarizer having a light incident surface and a light exiting surface and transmitting a light of the first polarization component of the white light and blocking a light of the second polarization component, a single light modulation device entered by the light of the first polarization component transmitted through the first polarizer, and modulating the light based on an image signal and generating an image light, and a projection lens projecting the image light, wherein the planar face of the parallelizing lens and one surface of the light incident surface and the light exiting surface of the first polarizer are in optical contact.

According to the projector having the above described configuration, the light incident surface or the light exiting surface of the first polarizer optically contacts the planar face of the parallelizing lens, and thereby, an air layer does not intervene between the parallelizing lens and the first polarizer. Accordingly, reflection of light by an interface of the air layer intervening between the parallelizing lens and the first polarizer is suppressed and light use efficiency of the white light may be increased.

Therefore, the projector having the above described configuration may display a bright image with reduced power consumption by efficiently taking the white light from the light source in the light modulation device and increasing light use efficiency.

Appendix 2

In the projector according to Appendix 1, the planar face of the parallelizing lens and the one surface of the light incident surface and the light exiting surface of the first polarizer are in physical contact.

According to the configuration, an air layer does not intervene between the parallelizing lens and the first polarizer and a loss by reflection of light at an interface between the parallelizing lens and the first polarizer may be reduced.

Appendix 3

In the projector according to Appendix 1, the planar face of the parallelizing lens and the one surface of the light incident surface and the light exiting surface of the first polarizer are bonded via an optical adhesive material.

According to the configuration, the first polarizer held on the parallelizing lens in good condition may be realized.

Appendix 4

The projector according to Appendix 1 further includes a second polarizer transmitting the light of the first polarization component of the white light and blocking the light of the second polarization component.

According to the configuration, the first polarizer and the second polarizer are combined, and thereby, the light of the first polarization component may be separated from the white light in good condition.

Appendix 5

In the projector according to Appendix 4, the planar face of the parallelizing lens optically contacts the light incident surface of the first polarizer, the first polarizer is a reflection-type polarizer and placed at a light exiting side of the parallelizing lens, and the second polarizer is an absorption-type polarizer and placed at a light exiting side of the first polarizer.

According to the configuration, the polarizers are placed in the order of the first polarizer as the reflection-type polarizer and the second polarizer as the absorption-type polarizer from the incident side of the white light. Accordingly, unnecessary polarization components not to be entered into the light modulation device of the components contained in the white light are reflected at the light incident side, and thereby, the amount of absorbed light by the absorption-type polarizer placed downstream is reduced. Therefore, heat generation of the second polarizer as the absorption-type polarizer may be suppressed compared to a configuration in which the polarizers are placed in the order of the absorption-type polarizer and the reflection-type polarizer at the incident side of the white light.

Appendix 6

In the projector according to Appendix 4, the planar face of the parallelizing lens optically contacts the light exiting surface of the first polarizer, the first polarizer is an absorption-type polarizer and placed at a light incident side of the parallelizing lens, and the second polarizer is a reflection-type polarizer and placed at a light incident side of the first polarizer.

According to the configuration, the polarizers are placed in the order of the first polarizer as the reflection-type polarizer and the second polarizer as the absorption-type polarizer from the incident side of the white light, and heat generation of the second polarizer as the absorption-type polarizer may be suppressed. Further, the second polarizer and the first polarizer are placed upstream of the parallelizing lens, and the light formed by removal of unnecessary polarization components of the components contained in the white light in advance enters the parallelizing lens. Thereby, the amount of light transmitted through the parallelizing lens is reduced to about half, and degradation of the parallelizing lens due to light may be suppressed.

Appendix 7

In the projector according to any one of Appendix 4 to Appendix 6, the second polarizer physically contacts the first polarizer.

According to the configuration, an air layer does not intervene between the first polarizer and the second polarizer and a loss by reflection of light at an interface between the first polarizer and the second polarizer may be reduced.

Appendix 8

In the projector according to any one of Appendix 1 to Appendix 7, the parallelizing lens is a resin Fresnel lens, and the first polarizer is an organic polarizer.

According to the configuration, reduction in size and weight of the projector may be realized by using the parallelizing lens including the resin Fresnel lens and the first polarizer including the organic polarizer.

What is claimed is:

1. A projector comprising:

a light source outputting a white light containing a first polarization component and a second polarization component;

a parallelizing lens having a lens face parallelizing the white light outputted from the light source and a planar face opposite to the lens face;

a first polarizer having a light incident surface and a light exiting surface and transmitting a light of the first polarization component of the white light and blocking a light of the second polarization component;

a single light modulation device modulating the light based on an image signal and generating an image light; and a projection lens projecting the image light, wherein the light of the first polarization component transmitted through the first polarizer enters the single light modulation device, the planar face of the parallelizing lens and one of the light incident surface of the first polarizer and the light exiting surface of the first polarizer are in optical contact, and the light of the first polarization component enters at the light incident surface and exits from the light exiting surface, and the light of the second polarization component enters at the light incident surface and does not exit from the light exiting surface.

2. The projector according to claim 1, wherein the planar face of the parallelizing lens and the one surface of the light incident surface and the light exiting surface of the first polarizer are in physical contact.

3. The projector according to claim 1, wherein the planar face of the parallelizing lens and the one surface of the light incident surface and the light exiting surface of the first polarizer are bonded via an optical adhesive material.

4. The projector according to claim 1, further comprising a second polarizer transmitting the light of the first polarization component of the white light and blocking the light of the second polarization component.

5. The projector according to claim 4, wherein the planar face of the parallelizing lens optically contacts the light incident surface of the first polarizer, the first polarizer is a reflection-type polarizer and placed at a light exiting side of the parallelizing lens, and the second polarizer is an absorption-type polarizer and placed at a light exiting side of the first polarizer.

6. The projector according to claim 4, wherein the planar face of the parallelizing lens optically contacts the light exiting surface of the first polarizer, the first polarizer is an absorption-type polarizer and placed at a light incident side of the parallelizing lens, and the second polarizer is a reflection-type polarizer and placed at a light incident side of the first polarizer.

7. The projector according to claim 4, wherein the second polarizer physically contacts the first polarizer.

8. The projector according to claim 1, wherein the parallelizing lens is a resin Fresnel lens, and the first polarizer is an organic polarizer.

9. A projector comprising:

a light source outputting a white light containing a first polarization component and a second polarization component;

a parallelizing lens having a lens face parallelizing the white light outputted from the light source and a planar face opposite to the lens face;

a first polarizer having a light incident surface and a light exiting surface and transmitting a light of the first polarization component of the white light and blocking a light of the second polarization component;

a single light modulation device modulating the light based on an image signal and generating an image light; and a projection lens projecting the image light, wherein the light of the first polarization component transmitted through the first polarizer enters the single light modulation device, the planar face of the parallelizing lens and one of the light incident surface of the first polarizer and the light exiting surface of the first polarizer are in optical contact, and the planar face of the parallelizing lens and the one surface of the light incident surface and the light exiting surface of the first polarizer are bonded via an optical adhesive material.

10. The projector according to claim 9, wherein the planar face of the parallelizing lens and the one surface of the light incident surface and the light exiting surface of the first polarizer are in physical contact.

11. The projector according to claim 9, further comprising a second polarizer transmitting the light of the first polarization component of the white light and blocking the light of the second polarization component.

12. The projector according to claim 11, wherein the planar face of the parallelizing lens optically contacts the light incident surface of the first polarizer, the first polarizer is a reflection-type polarizer and placed at a light exiting side of the parallelizing lens, and the second polarizer is an absorption-type polarizer and placed at a light exiting side of the first polarizer.

13. The projector according to claim 11, wherein the planar face of the parallelizing lens optically contacts the light exiting surface of the first polarizer, the first polarizer is an absorption-type polarizer and placed at a light incident side of the parallelizing lens, and the second polarizer is a reflection-type polarizer and placed at a light incident side of the first polarizer.

14. The projector according to claim 11, wherein the second polarizer physically contacts the first polarizer.

15. The projector according to claim 9, wherein the parallelizing lens is a resin Fresnel lens, and the first polarizer is an organic polarizer.

16. A projector comprising:

a light source outputting a white light containing a first polarization component and a second polarization component;

a parallelizing lens having a lens face parallelizing the white light outputted from the light source and a planar face opposite to the lens face;

a first polarizer having a light incident surface and a light exiting surface and transmitting a light of the first polarization component of the white light and blocking a light of the second polarization component;

a single light modulation device modulating the light based on an image signal and generating an image light;

a second polarizer transmitting the light of the first polarization component of the white light and blocking the light of the second polarization component, and a projection lens projecting the image light, wherein the light of the first polarization component transmitted through the first polarizer enters the single light modulation device, and the planar face of the parallelizing lens and one of the light incident surface of the first polarizer and the light exiting surface of the first polarizer are in optical contact.

* * * * *